United States Patent

[11] 3,601,086

[72] Inventor Van B. Hostetler
    Indianapolis, Ind.
[21] Appl. No. 63,126
[22] Filed Aug. 12, 1970
[45] Patented Aug. 24, 1971
[73] Assignee Eli Lilly and Company
    Indianapolis, Ind.
[23] Division of Ser. No. 3,213, Jan. 15, 1970, which is a continuation of Ser. No. 708,261, Feb. 26, 1968, abandoned

[54] TABLET-COATING APPARATUS
    3 Claims, 3 Drawing Figs.
[52] U.S. Cl. .................................................. 118/19,
                                                                118/50
[51] Int. Cl. ..................................................... A23g 3/26

[50] Field of Search .......................................... 118/19, 50,
    51, 70, 418, 303; 117/109; 134/104, 157, 163;
                                                          68/19; 34/85, 92

[56] References Cited
    UNITED STATES PATENTS

| 212,125 | 2/1879 | Bray | 51/164 |
|---|---|---|---|
| 348,011 | 8/1886 | Henderson, Jr. | 134/157 |
| 3,083,719 | 4/1968 | Herrling | 9/2 |
| 3,358,302 | 12/1967 | Candor | 34/92 |
| 3,401,668 | 9/1968 | Welsh et al. | 118/70 |

Primary Examiner—Morris Kaplan
Attorneys—Everet F. Smith and Houston L. Swenson

ABSTRACT: A tablet-coating apparatus is provided having a vented area about the periphery of a rotary tumbling drum. Exhaust means is removably positioned adjacent a portion of the drum's vented section in a manner which draws air and the coating material through the bed of tumbling tablets.

INVENTOR
VAN B. HOSTETLER

Patented Aug. 24, 1971

INVENTOR
VAN B. HOSTETLER
BY

ATTORNEY

TABLET-COATING APPARATUS

CROSS-REFERENCE TO RELATED APPLICATION

This application is a division of my copending U.S. application, Ser. No. 3,213, filed on Jan. 15, 1970, which is a continuation of my prior U.S. application, Ser. No. 708,261, filed on Feb. 26, 1968, and now abandoned.

BACKGROUND OF THE INVENTION

Apparatus used in the tablet-coating art has generally comprised the use of a stainless steel drum mounted for rotary movement for the purpose of tumbling a bed of tablets. A coating material in solution or suspension is introduced into the drum by various means such as by hand, hydraulic spraying equipment or airborne spraying equipment. As the tablets tumble in the drum they become coated with the solution. The solvent or external phase of the coating material in the solution evaporates, and in due course a film or coating of acceptable uniformity is produced on each tablet.

However, dust problems have been encountered in that the tablets as they tumble form dust which interferes with overall operation. In some instances, dust has formed which requires isolation of the drum from other manufacturing operations. Additionally, the dust precludes film coating of engraved tablets because of the "fill-in" problems it creates. Exhaust systems have been provided, and these generally comprise the suspension of an exhaust conduit in the mouth of the drum. Dust is substantially reduced by this arrangement, but the time for coating the tablets is longer than desired inasmuch as the exhaust system does not cause air to flow through the bed of tumbling tablets. Since complete penetration is lacking, some entrapment of the coating material's solvent within the tablet bed occurs, affecting the uniformity of the tablet film. Furthermore, blowback of the coating material into the operator's face is still possible.

Vented drums have been provided in an effort to create circulation through the bed of tablets, but the vents of such a structure become clogged with the coating material. Lengthy shutdown of the apparatus becomes necessary to unclog the drum's vents; and, consequently, the total operating efficiency of the unit is reduced.

SUMMARY OF THE INVENTION

The invention described herein is characterized by a side-vented rotary tumbling drum with an exhaust system externally connected to a lower portion of the vented section where the bed of tablets tumble. The exhaust system causes air to flow downwardly through the tumbling bed of tablets and out through the exhaust system, with three direct significant results. First, dust is immediately extracted from the drum and the bed of tablets without having a chance to create problems. Second, the continuous flow of air through the bed of tumbling tablets results in substantially increased ventilation of the tablets and thus faster and more uniform drying of the tablets as they are coated. Third, the current of air moving downwardly through the bed drives the coating material down through the bed of tablets so that instead of just coating the upper surface of the bed there is a much greater and more uniform dispersion of the coating material throughout the bed and consequent greater uniformity of coating application.

Further in accord with the invention, these three results occur not individually but simultaneously in combination in such manner as greatly to enhance the economy and efficiency of the coating process. In particular, the dust is extracted from the bed as it is generated and without being tumbled up into the upper regions of the bed, whereby it is neither itself coated nor adhered to coated tablets and therefore does not interfere with the coating process. The uniform dispersion of the coating material in the bed results in a thinner application of coating to a given tablet in a unit period of time, and this in combination with the enhanced ventilation results in rapid drying. Consequently, there is a progressive build of thin layers of coating material on the tablet to provide an excellent finish thereon and yet to do so in a short period of time. Thus, the flow of air downwardly through the bed and out through the side of the drum significantly enhances coating operations.

Thus, the object of this invention is to provide a new and improved tablet coating process and apparatus which makes more efficient use of the coating material, produces a uniform fine finish on the tablets, and requires a reduced amount of time for coating tablets.

Other objects and advantages of this invention will be apparent upon reading the following description in connection with the drawing.

Figure 1:
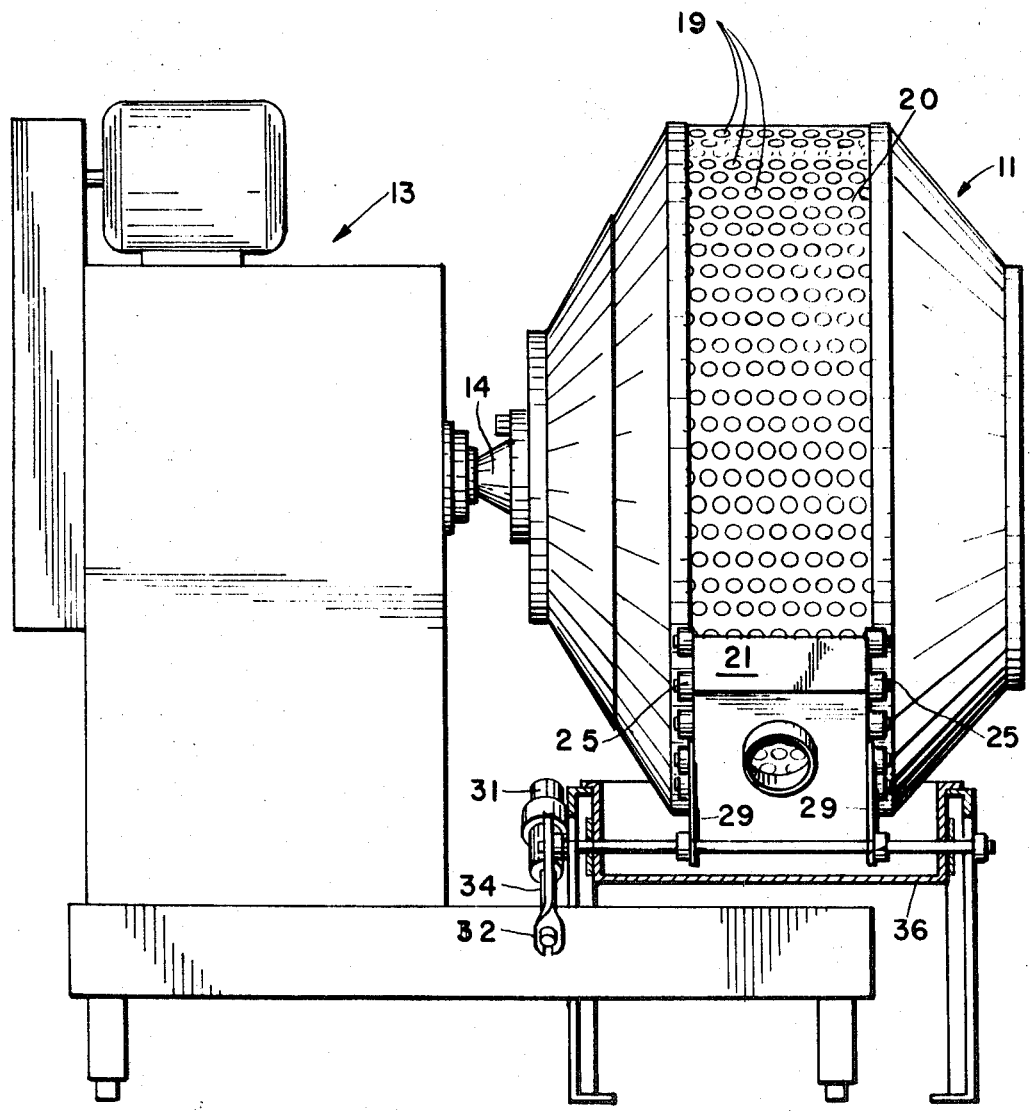
FIG. 1 is a side view of the coating apparatus of this invention.

Referring to the drawing, a rotary tumbling drum or coating pan 11 of a cylindrical configuration is provided. Drum 11 may be formed from stainless steel or any other rigid and durable material capable of withstanding repeated use in coating tablets and subsequent necessary cleansing operations. The drum is rotatably supported with its axis horizontal by power transmission means 13 which is coupled to a conventional drive unit 14 for rotary motion. Drum 11 has a wide front opening 16 for the introduction of tablets 17 and coating material and for removal of coated tablets.

The drum has a perforate peripheral wall 20 substantially concentric with its horizontal axis of rotation, and generally conical sidewalls tapering axially outward from the surface 20. A plurality of apertures 19 (shown enlarged for clarity) circumscribe the entire peripheral area or surface 20. Although these apertures are shown in the form of circular holes, they may also be formed by the use of a large mesh screen material or by perforations of other configuration. For the sake of convenience the peripheral surface or periphery of the drum will sometimes be referred to herein as being foraminous.

Figure 2:
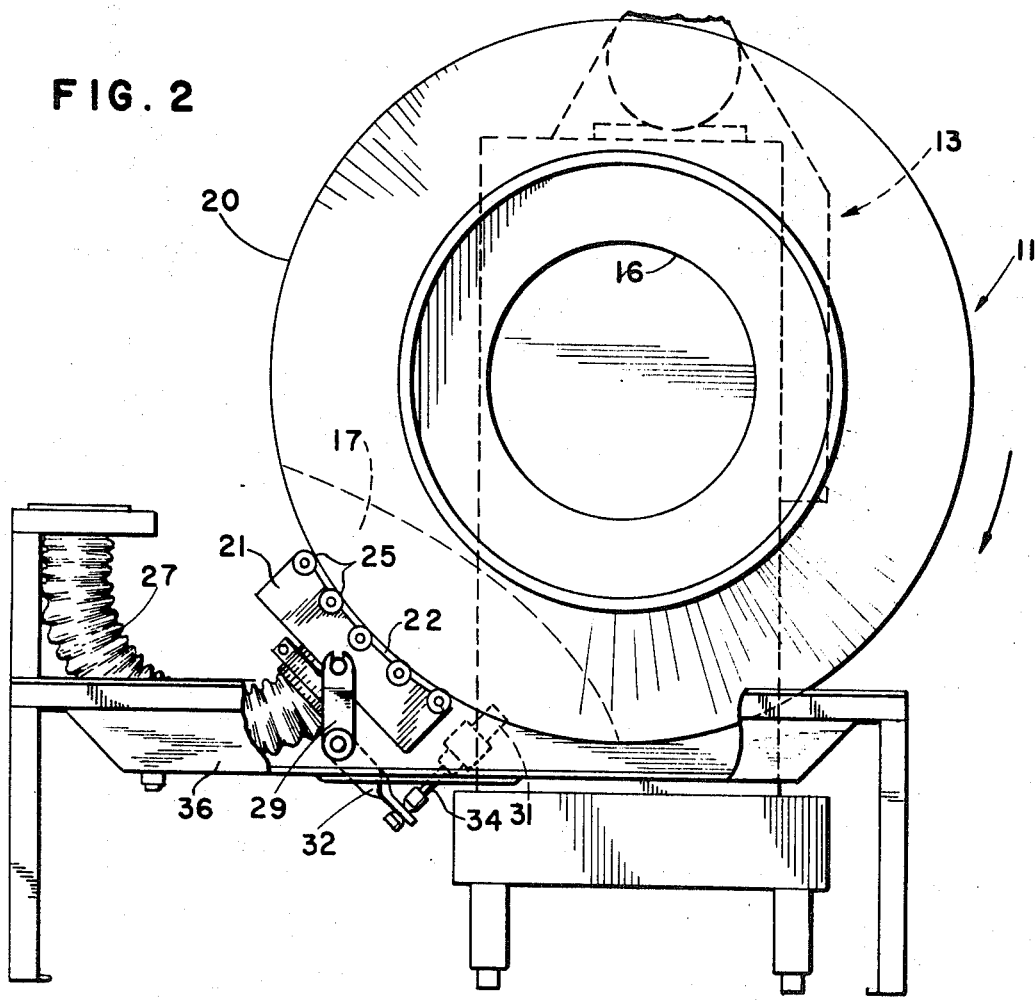
FIG. 2 is a front view of the coating apparatus.

Positioned at a lower quadrant of the drum's peripheral apertured area is an exhaust inlet 21. As shown in FIG. 2, this inlet has a curved surface 22 which is slightly spaced from the vented peripheral surface 20 of the drum. A number of rollers 25 are positioned on opposite sides of exhaust inlet 21 and are adapted for sliding contact with the drum. For the purposes of this application the term "sliding" includes other forms of relative motion contact including rolling contact. It is essential that the exhaust inlet be positioned adjacent to the leading lower quadrant of the drum where the tablets tumble.

It is by virtue of this construction that my coating pan derives its name "side-vented", i.e., air is exhausted or vented through the sidewall of the pan in distinction to the prior art axial disposition of the exhaust.

The drum or pan rotates at a relatively slow speed such as 10–30 r.p.m.; and, consequently, the tablets in the drum are not subjected to a significant centrifugal force. Thus, the tablets tend to remain in a continually tumbling pile or bed on the leading lower quadrant of the drum in the direction of rotation which in this particular embodiment is clockwise.

The tablet-tumbling action of the pan 11 is enhanced by the provision of outwardly tapered side walls contiguous to its foraminous periphery, whereby the bed of tablets is of varying width throughout its depth. Consequently, as the tablets are tumbled circumferentially by rotation of the drum or pan 11, they are also caused to move laterally, i.e., axially of the drum, thereby producing composite tablet movement and giving greater assurance of equal exposure of the tablets to the coating material. Also, this accommodates concentration of the exhaust inlet in a limited area without limiting the surface area of the bed for application of coating material to a large surface area.

Figure 3:
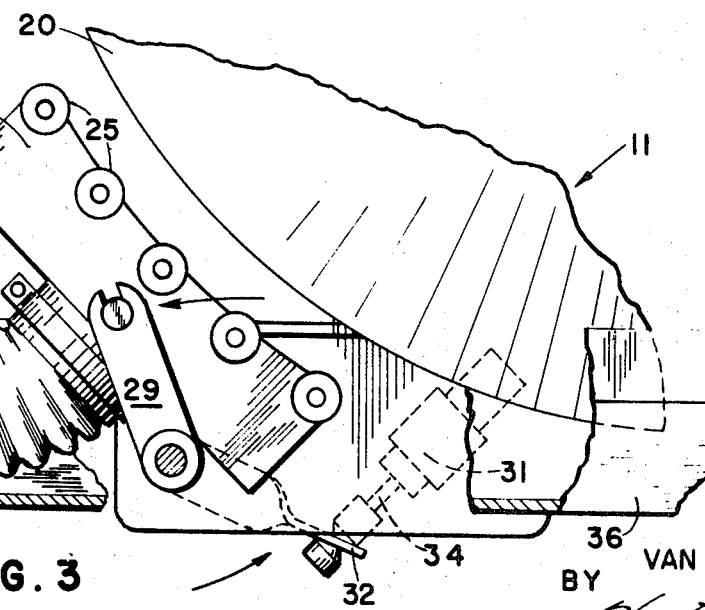
FIG. 3 is an enlarged partial front view illustrating the exhaust system in its second position for disassembly.

Connected to exhaust inlet 21 is a flexible conduit 27 which in turn has its other end connected to an air exhaust means not illustrated. Exhaust inlet 21 and conduit 27 are mounted for pivotable displacement into a second position shown in FIG. 3. In the particular illustrated embodiment this is accomplished by supporting the exhaust inlet on a pair of pivot arms 29. Arms 29 are pivotably connected to an air cylinder 31 by a connecting link 32. Thus, actuation of the air cylinder extends its piston rod 34 and the exhaust inlet is held in rolling contact with the drum's periphery. When the air cylinder is deactivated, the exhaust inlet and associated linkage assume the position shown in FIG. 3. Biasing of the exhaust inlet may be achieved by spring tension, counterweight or other suitable means.

Drum 11 is positioned with the bottommost portion extending into a cleansing bath 36 which also serves as a dust collector during the coating operation. Thus, after the drum has been used for coating a material it may be desirable to thoroughly remove all coating material substance from the drum apertures before coating another batch of tablets. Cleansing bath 36 may be filled with a cleansing solvent subsequent to the deactivation of air cylinder 31 for raising the exhaust inlet into the position shown in dotted lines. It is desirable to remove the exhaust inlet 21 from the cleansing bath in order to prevent moisture from entering the exhaust system. Inlet 21, once displaced to the position shown in FIG. 3, may be easily lifted from pivot arms 29 and set aside. Once this is effected the drum may be rotated in the bath to quickly remove particles lodged in the drum's apertures.

The apparatus of this invention has significantly reduced the amount of time needed for coating tablets. A variety of materials including the following have all shown substantial decrease in coating time: sugar, hydroxypropyl methylcellulose 10, ethylcellulose 7, hydroxypropyl cellulose, cellulose acetate phthalate, polyvinylpyrrolidone, polyethylene glycol 6,000, and other polymeric materials.

In one run a 5 percent solution of methylcellulose was used to coat tablets. The coating solution was introduced into the drum by an airborne type spray system under 25 pounds pressure. Drum speed was 22-24 r.p.m. In the conventional apparatus an exhaust line was associated with the opening of the drum. The amount of time required for satisfactorily coating the tablets with this conventional apparatus was 45 minutes. Apparatus modified according to this invention in which a side exhaust was utilized substantially reduced the amount of time for coating tablets with an identical solution. The time was reduced from 45 minutes to 15 minutes. There was no abrasion of the methylcellulose film on the tablets; and, in fact, it was noted that the apertures in the pan tended to aid in the rolling action of the tablets. It is believed that the coating time required for these tablets was reduced primarily due to the exhaust system which simultaneously pulled the coating solution and drying air downwardly through the bed of tumbling tablets.

In a second experiment a 4 percent solution of methylcellulose and 1 percent solution of ethylcellulose in a 50:50 solvent of methylene chloride and isopropanol was used to coat tablets. A spray system using 500 p.s.i. introduced this coating material onto the bed of tablets. Whereas conventional drum coating apparatus required 89 minutes, the apparatus of this invention required only 24 minutes.

The film appearance of the tablets produced by the apparatus of this invention is excellent. External appearance of the coating is exceptionally pleasing due to the progressive build of a plurality of thin coats. For the same reason, the uniformity in the thickness of the coating is significantly improved over coatings heretofore produced. Thickness uniformity is particularly desirable when the coating includes a therapeutical active ingredient.

Likewise, it was determined that the use of a ladle for introducing the coating solution will produce similar results. In general, the coating time required was reduced fifty percent.

It is apparent that the time required for cleansing the drums is also greatly reduced in view of the novel means for displacing the exhaust system from a cleansing bath enveloping a portion of the drum's periphery. Another benefit of the apparatus of this invention is its ability to "wash down" tablets. Occasionally, tablets are improperly coated and the tablets, instead of being discarded, are basket dipped in a solvent liquid to gradually wash off the coating. Thus, cleansing bath 36 may be filled with a solvent and the improperly coated tablets are then tumbled in the drum which extends into the cleansing bath. In this manner the tablets are in more uniform and consistent contact with the solution and the coating is quickly removed.

I claim:

1. A tablet-coating apparatus comprising in combination: a rotary tumbling drum having a horizontal axis of rotation, said drum having a flat foraminous peripheral surface substantially concentric with said axis and imperforate side wall portions contiguous to said peripheral surface, means for rotating said drum at a speed to effect tumbling of a charge of tablets in a bed of substantially uniform depth in a given sector in the lower leading quadrant of said drum with the lowermost layer of said tablets in contact with a given area of said drum's foraminous peripheral surface, said drum having an interior space above said bed or tumbling tablets through which a coating material is downwardly applied on said tumbling tablets, an exhaust inlet flexibly biased against the exterior of said drum's flat peripheral surface at said given sector and over an area less than and centrally located relative to said bed of tumbling tablets, said exhaust inlet being mounted on pivoted lever means removably supporting said exhaust inlet and swingable away from said drum to accommodate removal of said inlet from the exterior of said drum's flat peripheral surface, the area of said foraminous peripheral surface other than said sector providing an area greatly exceeding the area of said exhaust inlet, pressure differential means effecting a continuous velocity flow of a large quantity of air from said foraminous peripheral area other than said sector downwardly through said tumbling bed to said exhaust inlet for driving said coating material downwardly into the tumbling bed of tablets, drying the thus coated tablets and forcing the particles and dust from fragmented tablets at said given sector through the foraminous periphery of the drum and into the exhaust inlet.

2. A tablet-coating apparatus comprising in combination: a rotary tumbling drum having a horizontal axis of rotation, said drum having a flat foraminous peripheral surface substantially concentric with said axis and imperforate outwardly tapered side wall portions contiguous to said peripheral surface, means for rotating said drum at a speed to effect tumbling both circumferentially and axially of a charge of tablets in a bed of substantially uniform depth in a given sector in the lower leading quadrant of said drum with the lowermost layer of said tablets in contact with a given area of said drum's foraminous peripheral surface, said drum having an interior space above said bed of tumbling tablets through which a coating material is downwardly applied on said tumbling tablets, an exhaust inlet flexibly biased in rolling engagement against the exterior of said drum's flat peripheral surface at said given sector and over an area less than and centrally located both circumferentially and axially relative to said bed of tumbling tablets, said exhaust inlet being mounted on pivoted lever means removably supporting said exhaust inlet and swingable away from said drum to accommodate removal of said inlet from the exterior of said drum's flat peripheral surface, the area of said foraminous peripheral surface other than said exhaust inlet, pressure differential means effecting a continuous velocity flow of a large quantity of air from said foraminous peripheral area other than said sector downwardly through said tumbling bed to said exhaust inlet for driving said coating material downwardly into the tumbling bed of tablets drying the thus coated tablets and forcing the particles and dust from fragmented tablets at said given sector through the foraminous periphery of the drum and into the exhaust inlet.

3. A tablet-coating apparatus as defined in claim 1 in which a cleansing reservoir encompasses the lower peripheral surface of said drum proximate said sector.